US012087526B2

(12) United States Patent
Gentsch et al.

(10) Patent No.: US 12,087,526 B2
(45) Date of Patent: Sep. 10, 2024

(54) MEDIUM VOLTAGE CIRCUIT BREAKER SWITCHING POLE

(71) Applicant: ABB Schweiz AG, Baden (CH)

(72) Inventors: Dietmar Gentsch, Ratingen (DE); Christian Reuber, Willich (DE)

(73) Assignee: ABB Schweiz AG, Baden (CH)

( * ) Notice: Subject to any disclaimer, the term of this patent is extended or adjusted under 35 U.S.C. 154(b) by 186 days.

(21) Appl. No.: 17/556,190

(22) Filed: Dec. 20, 2021

(65) Prior Publication Data

US 2022/0115196 A1 Apr. 14, 2022

Related U.S. Application Data

(63) Continuation of application No. PCT/EP2020/066054, filed on Jun. 10, 2020.

(30) Foreign Application Priority Data

Jun. 21, 2019 (EP) .................................... 19181805

(51) Int. Cl.
*H01H 3/40* (2006.01)
*H01H 33/664* (2006.01)
*H01H 33/666* (2006.01)

(52) U.S. Cl.
CPC ............ *H01H 33/666* (2013.01); *H01H 3/40* (2013.01); *H01H 33/664* (2013.01)

(58) Field of Classification Search
CPC ............... H01H 33/664; H01H 33/666; H01H 33/6662; H01H 9/0072; H01H 3/40; H01H 3/32; H01H 2003/405; H01H 3/36
(Continued)

(56) References Cited

U.S. PATENT DOCUMENTS 3,447,047 A * 5/1969 Newton ................. B65D 85/68 361/279
4,793,458 A * 12/1988 Shealy .................. F16H 63/304 74/473.1
(Continued)

FOREIGN PATENT DOCUMENTS

CN 102737878 A 10/2012
CN 202816827 U 3/2013
(Continued)

OTHER PUBLICATIONS

European Patent Office, International Search Report in International Patent Application No. PCT/EP2020/066054, 3 pp. (Sep. 14, 2020).
(Continued)

*Primary Examiner* — William A Bolton
(74) *Attorney, Agent, or Firm* — Leydig, Voit & Mayer, Ltd.

(57) ABSTRACT

A medium voltage circuit breaker switching pole includes: a fixed contact of a vacuum interrupter; a movable contact of the interrupter; and a threaded drive element. The movable contact moves along a longitudinal axis of the interrupter. A center axis of the drive element is parallel to the longitudinal axis of the interrupter. When in an open configuration the fixed contact and movable contact are separated from one another. When in a closed configuration the fixed contact and movable contact are in contact with one another. Rotation of the drive element about its center axis in a first direction is transitions the switching pole from the open configuration to the closed configuration. Rotation of the drive element about its center axis in a second direction counter to the first direction transitions the switching pole from the closed configuration to the open configuration.

15 Claims, 8 Drawing Sheets

(58) Field of Classification Search
USPC ................................ 218/118, 120, 124, 140
See application file for complete search history.

(56) References Cited

U.S. PATENT DOCUMENTS

| | | | | |
|---|---|---|---|---|
| 5,889,248 | A | 3/1999 | Plettner et al. | |
| 6,410,875 | B2 * | 6/2002 | Allard | H01H 33/6641 218/120 |
| 2002/0104747 | A1 * | 8/2002 | Turner | H01H 71/70 200/330 |
| 2003/0173336 | A1 * | 9/2003 | Thursesson | H01H 33/36 218/118 |
| 2014/0090965 | A1 * | 4/2014 | Leccia | G01R 31/3274 200/308 |
| 2018/0151309 | A1 | 5/2018 | Huang et al. | |
| 2019/0096612 | A1 * | 3/2019 | Ebelsberger | H01H 3/36 |

FOREIGN PATENT DOCUMENTS

| | | | |
|---|---|---|---|
| CN | 203166388 | U | 8/2013 |
| CN | 103782362 | A | 5/2014 |
| CN | 208608154 | U | 3/2019 |
| DE | 913664 | C | 6/1954 |
| WO | WO 01/57896 | A1 | 8/2001 |

OTHER PUBLICATIONS

European Patent Office, Written Opinion in International Patent Application No. PCT/EP2020/066054, 6 pp. (Sep. 14, 2020).

* cited by examiner

MEDIUM VOLTAGE CIRCUIT BREAKER SWITCHING POLE

CROSS-REFERENCE TO PRIOR APPLICATIONS

This application is a continuation of International Patent Application No. PCT/EP2020/066054, filed on Jun. 10, 2020, which claims priority to European Patent Application No. EP 19181805.3, filed on Jun. 21, 2019. The entire disclosure of both applications is hereby incorporated by reference herein.

FIELD

One or more embodiments of the present invention may relate to a medium voltage circuit breaker switching pole, and to a medium voltage switching system.

BACKGROUND

Medium voltage (MV) switching poles or circuit breakers use for example levers or shafts to connect several switching poles (usually 3) mechanically to one drive. The poles themselves require a translational movement (like SF6 poles or vacuum poles). With levers and shafts, it is difficult to connect several switching poles unless they are arranged in one line.

There is a need to provide for an improved medium voltage circuit breaker switching pole.

SUMMARY

One or more embodiments of the present invention may provide a medium voltage circuit breaker switching pole that comprises: a fixed contact of a vacuum interrupter; a movable contact of the vacuum interrupter; and a threaded drive element. The movable contact may be configured to move along a longitudinal axis of the vacuum interrupter and a centre axis of the threaded drive element may be parallel to the longitudinal axis of the vacuum interrupter. When in an open configuration the fixed contact and the movable contact may be separated from one another; and when in a closed configuration the fixed contact and the movable contact may be in contact with one another. Rotation of the threaded drive element about the centre axis of the threaded drive element in a first direction may be configured to transition the switching pole from the open configuration to the closed configuration, and rotation of the threaded drive element about the centre axis in a second direction counter to the first direction may be configured to transition the switching pole from the closed configuration to the open configuration.

Therefore, it may be advantageous to have an improved medium voltage circuit breaker switching pole.

An object of one or more embodiments of the present invention may be solved with the subject matter of the independent claims, wherein further embodiments are incorporated in the dependent claims.

BRIEF DESCRIPTION OF THE DRAWINGS

One or more embodiments of the present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
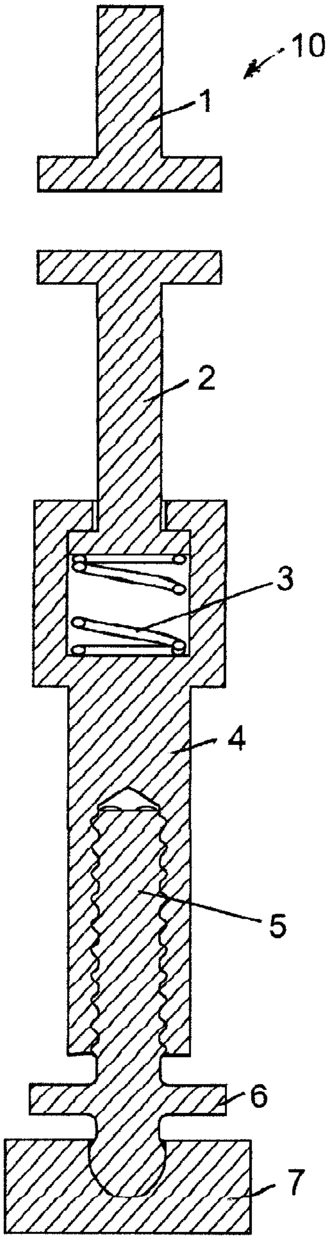
FIG. 1 shows a sectional view of an example of a medium voltage circuit breaker switching pole in an open configuration.

In a first aspect, there is provided a medium voltage circuit breaker switching pole, comprising:

a fixed contact of a vacuum interrupter;

a movable contact of the vacuum interrupter; and a threaded drive element.

The movable contact is configured to move along a longitudinal axis of the vacuum interrupter. A centre axis of the threaded drive element is parallel to the longitudinal axis of the vacuum interrupter. When in an open configuration the fixed contact and movable contact are separated from one another. When in a closed configuration the fixed contact and movable contact are in contact with one another. Rotation of the threaded drive element about its centre axis in a first direction is configured to transition the switching pole from the open configuration to the closed configuration. Rotation of the threaded drive element about its centre axis in a second direction counter to the first direction is configured to transition the switching pole from the closed configuration to the open configuration.

In this way, the rotational movement of a motor associated with the circuit breaker can be utilized itself in a direct manner, rather than transitioning to linear movement through levers or shafts. This leads to a simpler, more robust, switching pole and where a number of poles can be arranged more flexibly in relation to each other, whilst being driven from a common motor.

In an example, the centre axis of the threaded drive element is aligned along the longitudinal axis of the vacuum interrupter.

In an example, rotation of the threaded drive element about its centre axis in the first direction through a rotational angle of less than or equal to 360 degrees is configured to transition the switching pole from the open configuration to the closed configuration. Rotation of the threaded drive element about its centre axis in the second direction through a rotational angle of less than or equal to 360 degrees is configured to transition the switching pole from the closed configuration to the open configuration.

In this manner, a relatively small rotational movement leads to the required translational movement of the movable contact, that occurs within the required transition timescale.

In an example, an end of the threaded drive element distil to the movable contact comprises a ball bearing configured to rotate in a ball bearing socket.

In an example, the ball bearing and/or the ball bearing socket comprise a low friction surface material.

In an example, the switching pole comprises a threaded pushrod connected to the movable contact. The thread of the pushrod is configured to engage with the thread of the threaded drive element. Rotation of the threaded drive element is configured to move the threaded pushrod along the centre axis of the threaded drive element.

In an example, the threaded pushrod is movable connected to the movable contact. A contact pressure spring is configured to move the moveable contact relative to the threaded pushrod.

In an example, the threaded pushrod comprises an insulating material.

In an example, the threaded pushrod is configured not to rotate as the threaded drive element rotates.

In an example, an outer surface of the threaded pushrod comprises a groove extending in an axial direction of the threaded pushrod. The groove is configured to engage with a fixed pin such that axial movement of the threaded pushrod leads to the fixed pin moving within the groove.

In an example, the threaded drive element comprises a coupling. The coupling is configured to engage with a gear wheel or belt associated with a drive motor. Rotational movement of the coupling is configured to lead to an associated and equivalent rotational movement of the threaded drive element.

In a second aspect, there is provided a medium voltage switching system, comprising:

a first medium voltage circuit breaker switching pole according to the first aspect;

a second medium voltage circuit breaker switching pole according to the first aspect; and a third medium voltage circuit breaker switching pole according to the first aspect.

The first, second and third circuit breaker switching poles are configured to be driven by a single motor such that simultaneous rotation of each threaded drive of each switching pole is configured to transition each switching pole from the open configuration to the closed configuration.

In an example, rotation of the threaded drive element of each switching pole in the same direction is configured to transition each switching pole from the open configuration to the closed configuration.

In an example, rotation of the threaded drive element of the first and second switching poles in the same direction is configured to transition each switching pole from the open configuration to the closed configuration. Rotation of the threaded drive element of the third switching pole in the opposite direction is configured to transition the switching pole from the open configuration to the closed configuration.

In an example, at least one of the switching poles comprises a threaded drive element comprising an additional section to extend the length of the threaded drive element in the direction of its centre axis.

The above aspects and examples will become apparent from and be elucidated with reference to the embodiments described hereinafter.

FIGS. 1-8 relate to examples of a medium voltage circuit breaker switching pole. In an example, a medium voltage circuit breaker switching pole 10 comprises a fixed contact 1 of a vacuum interrupter, a movable contact 2 of the vacuum interrupter, and a threaded drive element 5. The movable contact is configured to move along a longitudinal axis of the vacuum interrupter. A centre axis of the threaded drive element is parallel to the longitudinal axis of the vacuum interrupter. When in an open configuration the fixed contact and movable contact are separated from one another. When in a closed configuration the fixed contact and movable contact are in contact with one another. Rotation of the threaded drive element about its centre axis in a first direction is configured to transition the switching pole from the open configuration to the closed configuration. Rotation of the threaded drive element about its centre axis in a second direction counter to the first direction is configured to transition the switching pole from the closed configuration to the open configuration.

In an example, the thread of the threaded drive element is a high helix thread.

In an example, the centre axis of the threaded drive element is aligned along the longitudinal axis of the vacuum interrupter.

In an example, rotation of the threaded drive element about its centre axis in the first direction through a rotational angle of less than or equal to 360 degrees is configured to transition the switching pole from the open configuration to the closed configuration. Rotation of the threaded drive element about its centre axis in the second direction through a rotational angle of less than or equal to 360 degrees is configured to transition the switching pole from the closed configuration to the open configuration.

In an example, an end of the threaded drive element distil to the movable contact comprises a ball bearing configured to rotate in a ball bearing socket 7.

In an example, the ball bearing and/or the ball bearing socket comprise a low friction surface material.

In an example, the function of the ball bearing and/or the ball bearing socket 7 is fulfilled by an industrially available inclined ball bearing. This can comprise a low friction surface material.

In an example, the switching pole comprises a threaded pushrod 4 connected to the movable contact. The thread of the pushrod is configured to engage with the thread of the threaded drive element. Rotation of the threaded drive element is configured to move the threaded pushrod along the centre axis of the threaded drive element.

In an example, the threaded pushrod has a female thread and the threaded drive element has a male thread.

In an example, the threaded pushrod has a male thread and the threaded drive element has a female thread.

In an example, the threaded pushrod is movable connected to the movable contact. A contact pressure spring 3 is configured to move the moveable contact relative to the threaded pushrod.

In an example, the threaded pushrod comprises an insulating material.

In an example, the threaded pushrod is configured not to rotate as the threaded drive element rotates.

In an example, an outer surface of the threaded pushrod comprises a groove extending in an axial direction of the threaded pushrod. The groove is configured to engage with a fixed pin such that axial movement of the threaded pushrod leads to the fixed pin moving within the groove.

In an example, the threaded drive element comprises a coupling 6. The coupling is configured to engage with a gear wheel or belt 30 associated with a drive motor 20. Rotational movement of the coupling is configured to lead to an associated and equivalent rotational movement of the threaded drive element.

Thus, in this manner a thread is used to convert a rotational movement from a drive to a fast translational movement of the pole, where for example that thread can be a high helix thread giving a large translational movement for a relatively small rotational movement.

FIGS. 1-8 also relate to a medium voltage switching system. In an example the system comprises: a first medium voltage circuit breaker switching pole as described above; a second medium voltage circuit breaker switching pole as described above; and a third medium voltage circuit breaker switching pole as described above. The first, second and third circuit breaker switching poles are configured to be driven by a single motor such that simultaneous rotation of each threaded drive of each switching pole is configured to transition each switching pole from the open configuration to the closed configuration.

In an example, rotation of the threaded drive element of each switching pole in the same direction is configured to transition each switching pole from the open configuration to the closed configuration.

Thus, the threaded drive elements all have right hand threads or left hand threads.

In an example, rotation of the threaded drive element of the first and second switching poles in the same direction is configured to transition each switching pole from the open configuration to the closed configuration. Rotation of the threaded drive element of the third switching pole in the opposite direction is configured to transition the switching pole from the open configuration to the closed configuration.

Thus, the threaded drive elements of two of the switching pols is right handed and the other pole has a threaded drive element that is left handed, or vice versa.

In an example, at least one of the switching poles comprises a threaded drive element comprising an additional section 8 to extend the length of the threaded drive element in the direction of its centre axis.

Thus, the manner in which the poles are driven enables several poles to be connected to one or more drives using toothed belts, chains, gear-wheels or alike, enabling arbitrary arrangement of the switching poles.

Continuing with the figures, the medium voltage circuit breaker switching pole and medium voltage switching system are described in further detail, with respect to specific embodiments.

Figure 2:
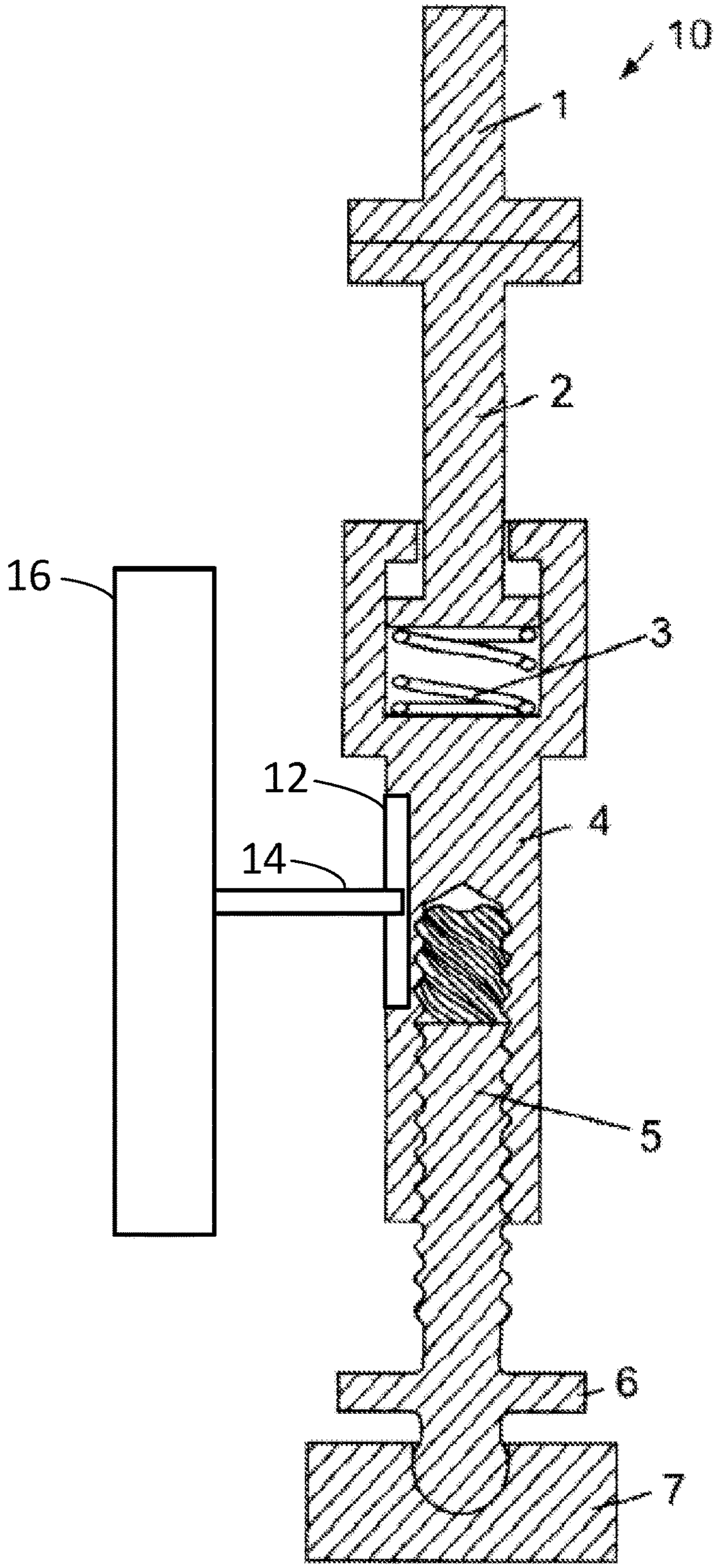
FIG. 2 shows a sectional view of the medium voltage circuit breaker switching pole of FIG. 1 in a closed configuration.

FIG. 1 shows the switching pole in an open position, whilst FIG. 2 shows it in a closed position.

In FIG. 1 the vertical position of pushrod 4 is determined by the rotational angle of the drive element 5. The spring 3 pushes the movable contact to the upper collar of the pushrod 4. A distance between the fixed contact 1 and the movable contact 2 is the result. The vacuum interrupter VI is thus in an open configuration.

When the drive element 5 is rotated by a certain angle, the pushrod 4 moves upwards due to the thread. With industrially available high helix threads, it is possible to achieve the full stroke of the pushrod 4 with about one rotation of the drive element 5. The upward movement of the pushrod 4 drives the movable contact against the fixed contact of the vacuum interrupter. A relatively small further upward movement of the pushrod 4 further compresses the contact pressure spring 3, to ensure the required contact pressure.

The pushrod 4 is configured not to rotate during the upward or downward motion. This can be done in a number of different ways, with one way being to have a vertical groove 12 in the pushrod 4 that runs over a pin 14 that is fixedly connected to the environment via element 16.

As shown a ball bearing, consisting of the lower end of the drive element 5, that is generally formed like a ball, and the fixed part of the ball bearing 7, that is generally formed like a pit, is used to support the pushrod vertically against the force of the contact pressure spring 3. The ball bearing also supports the switching pole 10 against lateral forces generated by the coupling 6 to a chain, belt or gear-wheel. The ball bearing joint can be formed in a known manner to minimise frictional forces.

The function of the ball bearing and/or the ball bearing socket 7 can as well be fulfilled by an industrially available inclined ball bearing.

Figure 3:
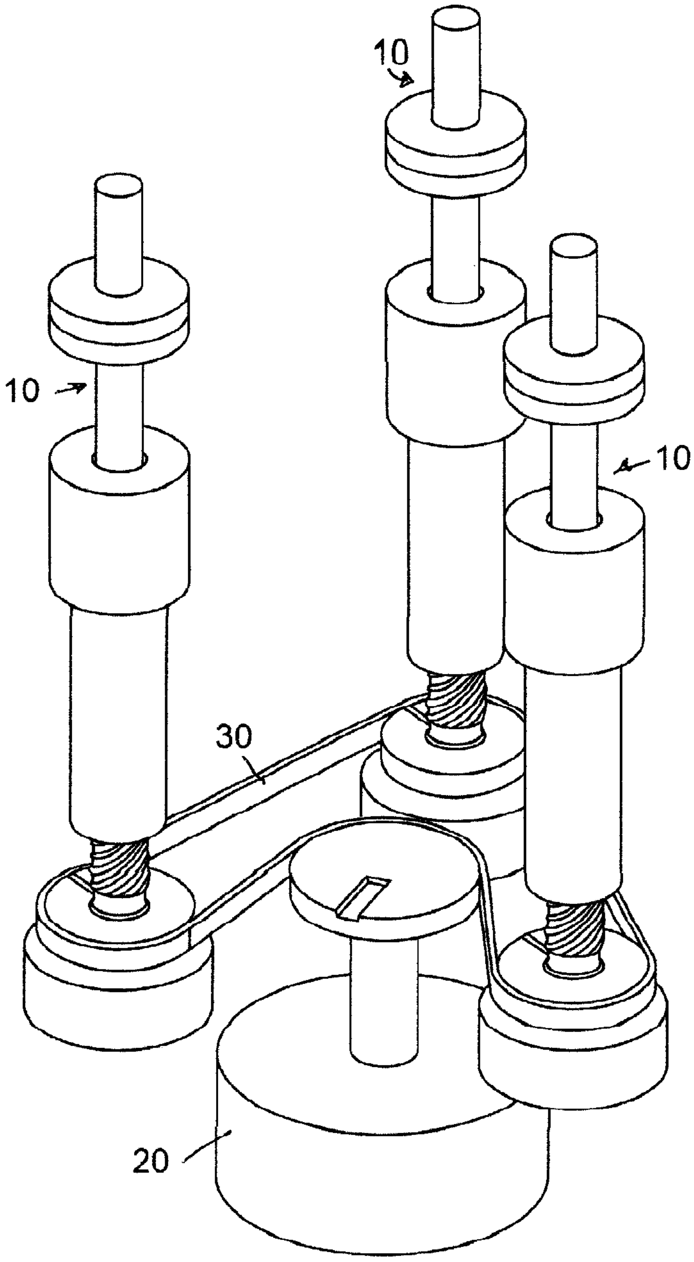
FIG. 3 shows an example of an arrangement of three medium voltage circuit breaker switching poles.

FIG. 3 shows how three switching poles can easily be connected in a 120° arrangement to a drive 20. The switching poles 10 are in the closed position as an example. This arrangement is advantageous when the three switching poles are to be installed in a cylindrical enclosure.

Here, a drive system can have a double sided toothed belt 30 as an example. Alternatively, a chain or a single-sided toothed belt with pulleys can be used. The drive or motor 20 is located in the center as an example; other locations are also possible.

Figure 4:
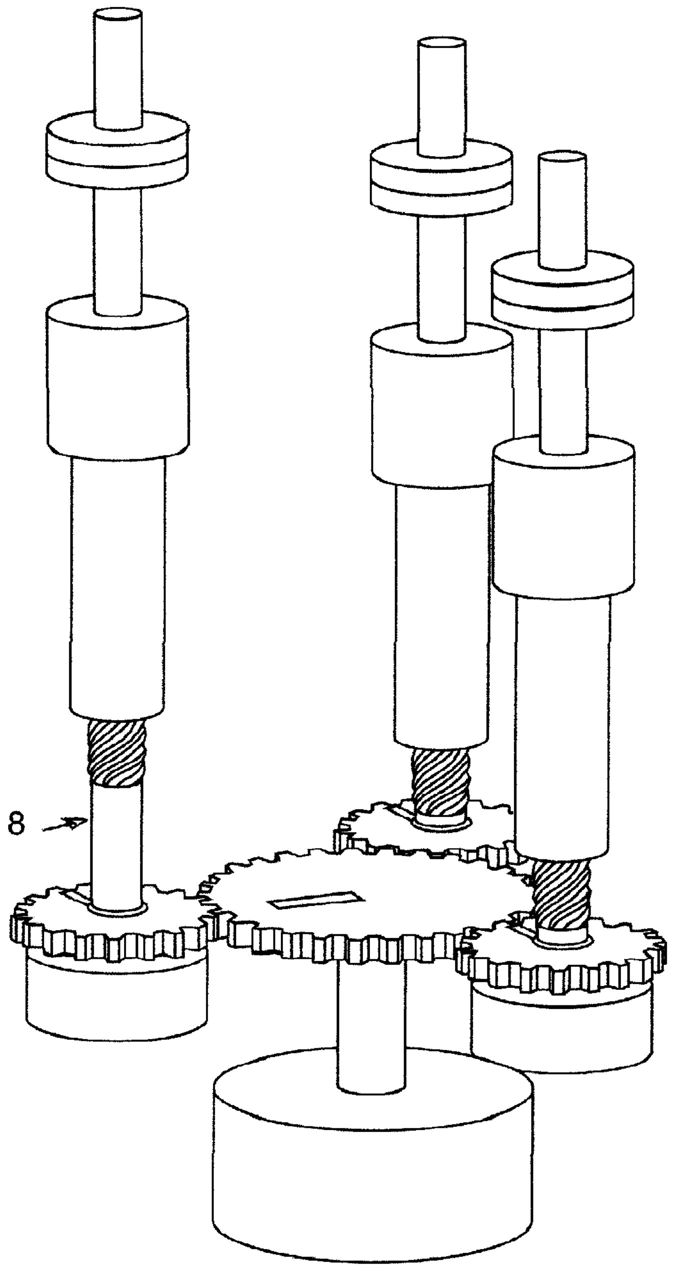
FIG. 4 shows an example of an arrangement of three medium voltage circuit breaker switching poles.

FIG. 4 shows how the connection of the three poles with the drives can be made with gear-wheels. The diameters of the gear-wheel of the drive and the gear-wheels of the poles can be adjusted to optimize the adaption of the torque and speed that the drive can generate to the torque and speed that is required for proper closing and opening operations of the switching poles.

What is further shown in FIG. 4 is that the poles can have different heights. This is controlled through the provision of an additional section 8 of the drive elements. This enables arbitrary positions of the switching poles, following the requirements of the environment of the circuit breaker CB, e.g., the air- or gas-insulated panel where the CB is installed.

Further, it is possible to connect more than one drive to the switching poles, when more drive power is required for a certain application. One drive can be used for a low-duty CB, while for a high-duty CB two drives can be used.

Figure 5:
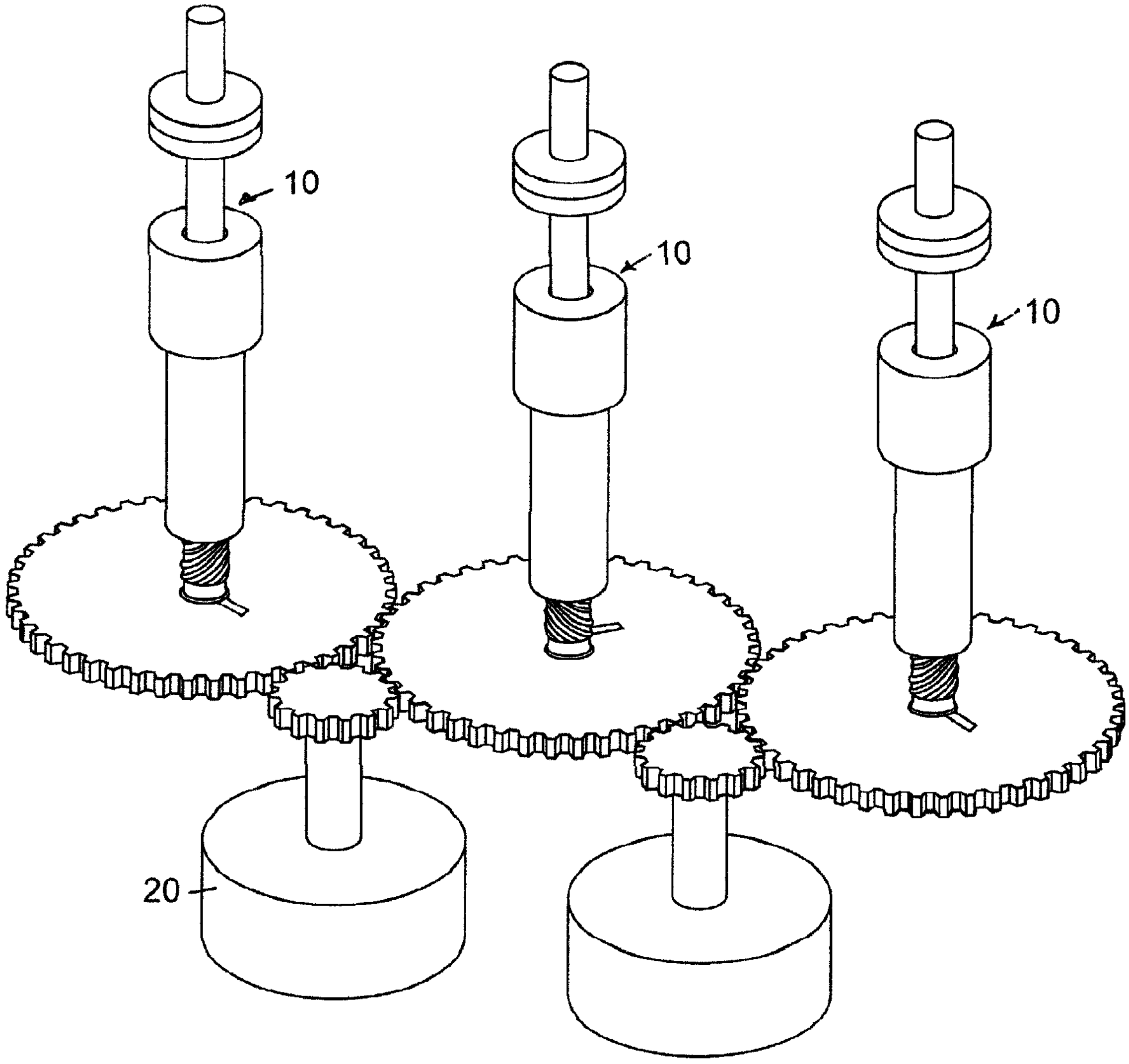
FIG. 5 shows an example of an arrangement of three medium voltage circuit breaker switching poles.

FIG. 5 shows an alternative way to connect three switching poles 10 to each other and to two drives 20. It is required to use right-hand and left-hand threads alternately, as the sense of rotation of the gear-wheels changes from pole to pole, while the sense of translation of the pushrods has to be the same.

Figure 6:
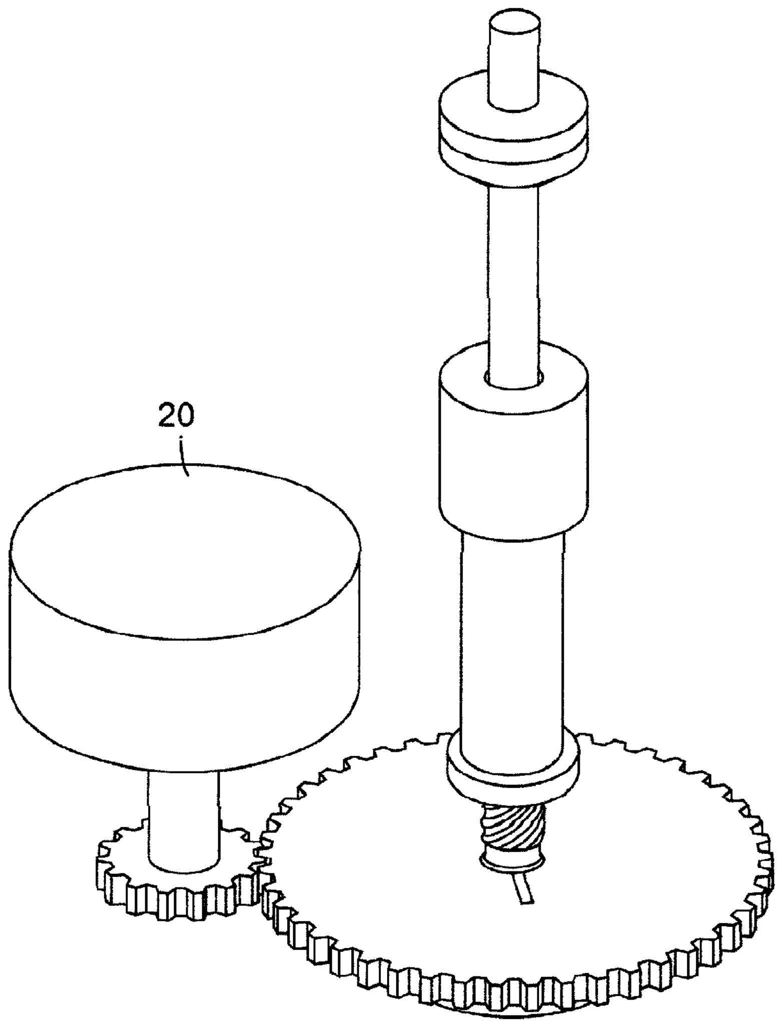
FIG. 6 shows an example of a medium voltage circuit breaker switching pole.

FIG. 6 shows a solution for a single pole having an individual drive. Depending on space constraints that may arise from the external switchgear, it can be advantageous to place the drive not below but to the side of the switching pole. The arrangement of pole and drive as shown in FIG. 6 can be hosted in a common insulating housing to form an integrated single pole CB, similar to the arrangement shown in FIG. 8.

Figure 7:
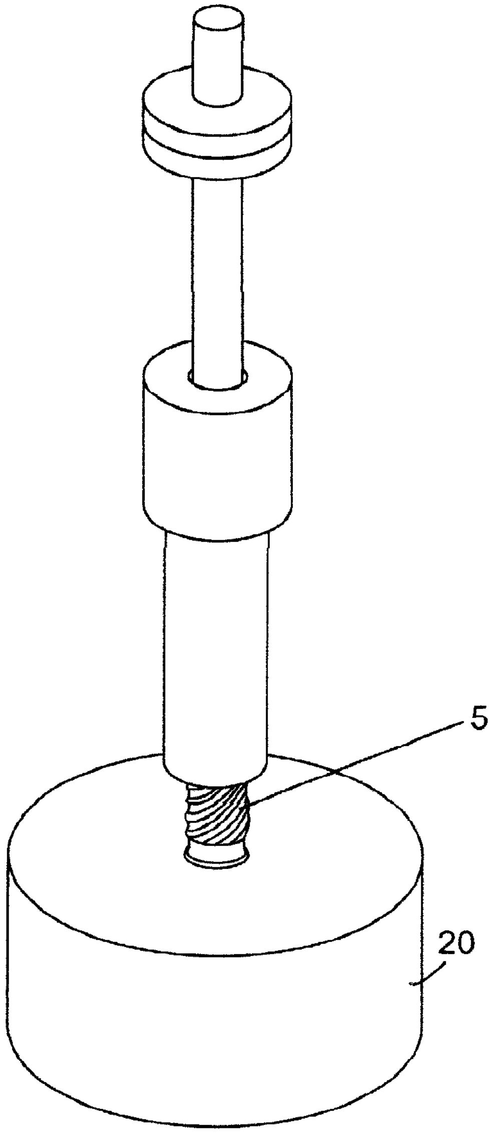
FIG. 7 shows an example of a medium voltage circuit breaker switching pole.

FIG. 7 shows a single pole having an individual drive 20 directly coupled to the drive element 5. Here, the switching pole is in closed position. Thereby, any additional gear can be avoided. When the drive is controlled appropriately, for example using servomotors or stepper motors, then the travel curve of the moveable contact of the vacuum interrupter VI can also be appropriately controlled to the required level of precision with a minimum number of mechanical parts involved. This precise control is advantageous for example for synchronized switching or for constant closing and opening speeds independent of for example VI contact wear, temperature dependent friction or alike.

Figure 8:
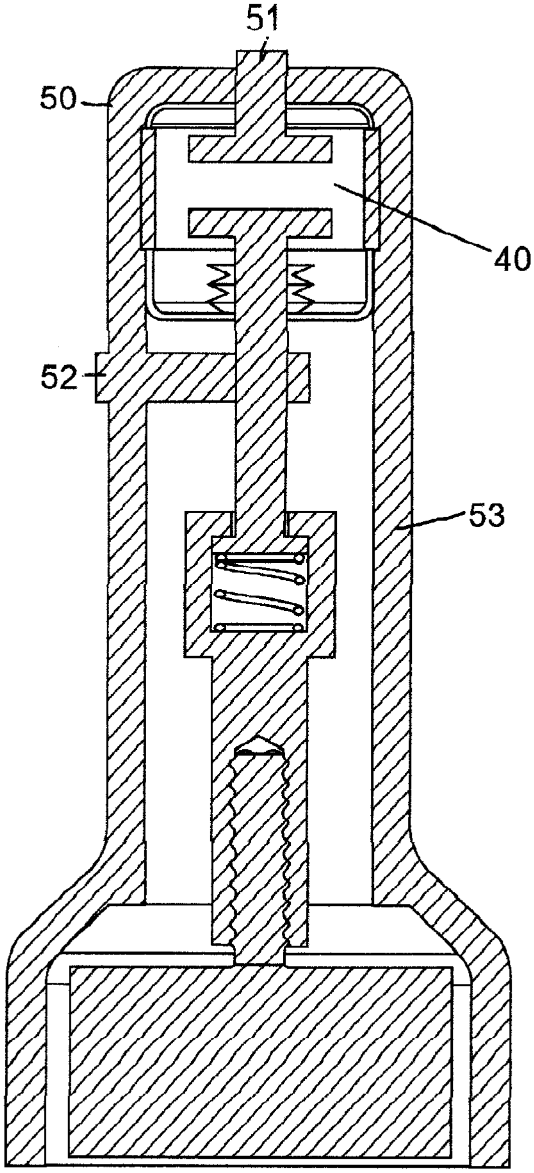
FIG. 8 shows a cross-section through a medium voltage circuit breaker switching pole.

FIG. 8 shows an integrated single phase CB 50 following that shown in FIG. 7. The single phase CB is shown in open position. The insulating housing may be closed by a lid at the bottom (not shown). An additional rotating mass (not shown) may be added on the common axis of pole and drive to harmonise the travel curve and to improve possible weld-breaking of a short-circuit opening operation.

While one or more embodiments of the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1: Fixed contact of a Vacuum Interrupter
2: Movable contact of a Vacuum Interrupter
3: Contact pressure spring
4: Pushrod; mainly made of insulating material; has high helix female thread in its lower end
5: Drive element; generally made of metal; has high helix male thread in its upper part and ball bearing in its lower part
6: Coupling to chain, belt or gear-wheel; integrated in 5
7: Fixed part of ball bearing
8: additional section of drive element 5
10: Switching pole
20: Drive or motor
30: Drive belt
40: Vacuum Interrupter
51: Upper terminal of the Circuit Breaker; connected to the fixed contact of the Vacuum Interrupter.
52: Lower terminal of the Circuit Breaker; connected to the movable contact of the Vacuum Interrupter by a flexible conductor or a sliding contact or the like
53: Insulating housing

What is claimed is:

1. A medium voltage circuit breaker switching pole, comprising:
a fixed contact of a vacuum interrupter;
a movable contact of the vacuum interrupter; and
a threaded drive element,
wherein:
the movable contact is configured to move along a longitudinal axis of the vacuum interrupter,
a center axis of the threaded drive element is parallel to the longitudinal axis of the vacuum interrupter, when in an open configuration the fixed contact and the movable contact are separated from one another,
when in a closed configuration the fixed contact and the movable contact are in contact with one another,
the switching pole further comprises a threaded pushrod connected to the movable contact,
a thread of the threaded pushrod is configured to engage with a thread of the threaded drive element,
rotations of the threaded drive element are configured to move the threaded pushrod along the center axis of the threaded drive element, and wherein the threaded pushrod is configured not to rotate as the threaded drive element rotates,
an outer surface of the threaded pushrod comprises a groove extending in an axial direction of the threaded pushrod,
the groove is configured to engage with a fixed pin such that axial movement of the threaded pushrod leads to the fixed pin moving within the groove,
rotation of the threaded drive element about the center axis of the threaded drive element in a first direction is configured to transition the switching pole from the open configuration to the closed configuration, and
rotation of the threaded drive element about the center axis in a second direction counter to the first direction is configured to transition the switching pole from the closed configuration to the open configuration.

2. The medium voltage circuit breaker switching pole according to claim 1, wherein the center axis of the threaded drive element is aligned along the longitudinal axis of the vacuum interrupter.

3. The medium voltage circuit breaker switching pole according to claim 1, wherein:
the rotation of the threaded drive element about the center axis in the first direction through a rotational angle of less than or equal to 360 degrees is configured to transition the switching pole from the open configuration to the closed configuration, and
the rotation of the threaded drive element about the center axis in the second direction through a rotational angle of less than or equal to 360 degrees is configured to transition the switching pole from the closed configuration to the open configuration.

4. The medium voltage circuit breaker switching pole according to claim 1, wherein an end of the threaded drive element distal to the movable contact comprises a ball bearing configured to rotate in a ball bearing socket or an inclined ball bearing.

5. The medium voltage circuit breaker switching pole according to claim 4, wherein the ball bearing and/or the ball bearing socket comprise a low friction surface material.

6. The medium voltage circuit breaker switching pole according to claim 1, wherein:
the threaded pushrod is movable connected to the movable contact, and
a contact pressure spring is configured to move the moveable contact relative to the threaded pushrod.

7. The medium voltage circuit breaker switching pole according to claim 1, wherein the threaded pushrod comprises an insulating material.

8. The medium voltage circuit breaker switching pole according to claim 1, wherein:
the threaded drive element comprises a coupling,
the coupling is configured to engage with a gear wheel or belt associated with a drive motor, and rotational movement of the coupling is configured to lead to an associated and equivalent rotational movement of the threaded drive element.

9. A medium voltage switching system, comprising:

a first medium voltage circuit breaker switching pole according to claim 1;

a second medium voltage circuit breaker switching pole according to claim 1;

a third medium voltage circuit breaker switching pole according to claim 1, wherein the first, second, and third circuit breaker switching poles are configured to be driven by a single motor such that simultaneous rotation of each threaded drive of each switching pole is configured to transition each switching pole from the open configuration to the closed configuration.

10. The medium voltage switching system according to claim 9, wherein rotation of the threaded drive element of each switching pole in a first direction is configured to transition each switching pole from the open configuration to the closed configuration.

11. The medium voltage switching system according to claim 9, wherein:

rotation of the threaded drive element of the first and second switching poles in a first direction is configured to transition each switching pole from the open configuration to the closed configuration, and rotation of the threaded drive element of the third switching pole in a second direction counter to the first direction is configured to transition the switching pole from the open configuration to the closed configuration.

12. The medium voltage switching system according to claim 9, wherein at least one of the switching poles comprises a second threaded drive element comprising an additional section to extend a length of the threaded drive element in the direction of the center axis of the threaded drive element.

13. A medium voltage switching system, comprising:

a first medium voltage circuit breaker switching pole, wherein the first medium voltage circuit breaker switching pole comprises:

a first fixed contact of a first vacuum interrupter;

a first movable contact of the first vacuum interrupter; and a first threaded drive element, wherein:

the first movable contact is configured to move along a first longitudinal axis of the first vacuum interrupter, a first center axis of the first threaded drive element is parallel to the longitudinal axis of the first vacuum interrupter, when in an open configuration the first fixed contact and the first movable contact are separated from one another, when in a closed configuration the first fixed contact and the first movable contact are in contact with one another, rotation of the first threaded drive element about the first center axis of the first threaded drive element in a first direction is configured to transition the first switching pole from the open configuration to the closed configuration, and rotation of the first threaded drive element about the first center axis in a second direction counter to the first direction is configured to transition the first switching pole from the closed configuration to the open configuration;

a second medium voltage circuit breaker switching pole, wherein the second medium voltage circuit breaker switching pole comprises:

a second fixed contact of a second vacuum interrupter;

a second movable contact of the second vacuum interrupter; and a second threaded drive element, wherein:

the second movable contact is configured to move along a second longitudinal axis of the second vacuum interrupter, a second center axis of the second threaded drive element is parallel to the longitudinal axis of the second vacuum interrupter, when in an open configuration the second fixed contact and the second movable contact are separated from one another, when in a closed configuration the second fixed contact and the second movable contact are in contact with one another, rotation of the second threaded drive element about the second center axis of the second threaded drive element in the first direction is configured to transition the second switching pole from the open configuration to the closed configuration, and rotation of the second threaded drive element about the second center axis in the second direction counter to the first direction is configured to transition the second switching pole from the closed configuration to the open configuration;

a third medium voltage circuit breaker switching pole, wherein the third medium voltage circuit breaker switching pole comprises:

a third fixed contact of a third vacuum interrupter;

a third movable contact of the third vacuum interrupter; and a third threaded drive element, wherein:

the third movable contact is configured to move along a third longitudinal axis of the third vacuum interrupter, a third center axis of the third threaded drive element is parallel to the longitudinal axis of the third vacuum interrupter, when in an open configuration the third fixed contact and the third movable contact are separated from one another, when in a closed configuration the third fixed contact and the third movable contact are in contact with one another, rotation of the third threaded drive element about the third center axis of the third threaded drive element in the first direction is configured to transition the third switching pole from the open configuration to the closed configuration, and rotation of the third threaded drive element about the third center axis in the second direction counter to the first direction is configured to transition the third switching pole from the closed configuration to the open configuration;

wherein:

the first, second, and third circuit breaker switching poles are configured to be driven by a single motor such that simultaneous rotation of each threaded drive of each switching pole is configured to transition each switching pole from the open configuration to the closed configuration, rotation of the threaded drive element of the first and second switching poles in the first direction is configured to transition each switching pole from the open configuration to the closed configuration, and rotation of the threaded drive element of the third switching pole in the second direction is configured to transition the switching pole from the open configuration to the closed configuration.

14. A medium voltage switching system, comprising:

a first medium voltage circuit breaker switching pole, wherein the first medium voltage circuit breaker switching pole comprises:

a first fixed contact of a first vacuum interrupter;

a first movable contact of the first vacuum interrupter; and a first threaded drive element, wherein:

the first movable contact is configured to move along a first longitudinal axis of the first vacuum interrupter, a first center axis of the first threaded drive element is parallel to the longitudinal axis of the first vacuum interrupter, when in an open configuration the first fixed contact and the first movable contact are separated from one another, when in a closed configuration the first fixed contact and the first movable contact are in contact with one another, rotation of the first threaded drive element about the first center axis of the first threaded drive element in a first direction is configured to transition the first switching pole from the open configuration to the closed configuration, and rotation of the first threaded drive element about the first center axis in a second direction counter to the first direction is configured to transition the first switching pole from the closed configuration to the open configuration;

a second medium voltage circuit breaker switching pole, wherein the second medium voltage circuit breaker switching pole comprises:

a second fixed contact of a second vacuum interrupter;

a second movable contact of the second vacuum interrupter; and a second threaded drive element, wherein:

the second movable contact is configured to move along a second longitudinal axis of the second vacuum interrupter, a second center axis of the second threaded drive element is parallel to the longitudinal axis of the second vacuum interrupter, when in an open configuration the second fixed contact and the second movable contact are separated from one another, when in a closed configuration the second fixed contact and the second movable contact are in contact with one another, rotation of the second threaded drive element about the second center axis of the second threaded drive element in the first direction is configured to transition the second switching pole from the open configuration to the closed configuration, and rotation of the second threaded drive element about the second center axis in the second direction counter to the first direction is configured to transition the second switching pole from the closed configuration to the open configuration;

a third medium voltage circuit breaker switching pole, wherein the third medium voltage circuit breaker switching pole comprises:

a third fixed contact of a third vacuum interrupter;

a third movable contact of the third vacuum interrupter; and a third threaded drive element, wherein:

the third movable contact is configured to move along a third longitudinal axis of the third vacuum interrupter, a third center axis of the third threaded drive element is parallel to the longitudinal axis of the third vacuum interrupter, when in an open configuration the third fixed contact and the third movable contact are separated from one another, when in a closed configuration the third fixed contact and the third movable contact are in contact with one another, rotation of the third threaded drive element about the third center axis of the third threaded drive element in the first direction is configured to transition the third switching pole from the open configuration to the closed configuration, and rotation of the third threaded drive element about the third center axis in the second direction counter to the first direction is configured to transition the third switching pole from the closed configuration to the open configuration, wherein:

the first, second, and third circuit breaker switching poles are configured to be driven by a single motor such that simultaneous rotation of each threaded drive of each switching pole is configured to transition each switching pole from the open configuration to the closed configuration, and at least one of the switching poles comprises a fourth threaded drive element comprising an additional section to extend a length of the first, second, and third threaded drive elements in the direction of the center axis of the first, second, and third threaded drive elements.

15. A medium voltage switching system, comprising:

a first medium voltage circuit breaker switching pole, wherein the first medium voltage circuit breaker switching pole comprises:

a first fixed contact of a first vacuum interrupter;

a first movable contact of the first vacuum interrupter; and a first threaded drive element, wherein:

the first movable contact is configured to move along a first longitudinal axis of the first vacuum interrupter, a first center axis of the first threaded drive element is parallel to the longitudinal axis of the first vacuum interrupter, when in an open configuration the first fixed contact and the first movable contact are separated from one another, when in a closed configuration the first fixed contact and the first movable contact are in contact with one another, rotation of the first threaded drive element about the first center axis of the first threaded drive element in a first direction is configured to transition the first switching pole from the open configuration to the closed configuration, and rotation of the first threaded drive element about the first center axis in a second direction counter to the first direction is configured to transition the first switching pole from the closed configuration to the open configuration;

a second medium voltage circuit breaker switching pole, wherein the second medium voltage circuit breaker switching pole comprises:

a second fixed contact of a second vacuum interrupter;

a second movable contact of the second vacuum interrupter; and a second threaded drive element, wherein:

the second movable contact is configured to move along a second longitudinal axis of the second vacuum interrupter, a second center axis of the second threaded drive element is parallel to the longitudinal axis of the second vacuum interrupter, when in an open configuration the second fixed contact and the second movable contact are separated from one another, when in a closed configuration the second fixed contact and the second movable contact are in contact with one another, rotation of the second threaded drive element about the second center axis of the second threaded drive element in the first direction is configured to transition the second switching pole from the open configuration to the closed configuration, and rotation of the second threaded drive element about the second center axis in the second direction counter to the first direction is configured to transition the second switching pole from the closed configuration to the open configuration;

a third medium voltage circuit breaker switching pole, wherein the third medium voltage circuit breaker switching pole comprises:

a third fixed contact of a third vacuum interrupter;

a third movable contact of the third vacuum interrupter; and a third threaded drive element, wherein:

the third movable contact is configured to move along a third longitudinal axis of the third vacuum interrupter, a third center axis of the third threaded drive element is parallel to the longitudinal axis of the third vacuum interrupter, when in an open configuration the third fixed contact and the third movable contact are separated from one another, when in a closed configuration the third fixed contact and the third movable contact are in contact with one another, the switching pole further comprises a threaded pushrod connected to the movable contact, a thread of the threaded pushrod is configured to engage with a thread of the threaded drive element, rotations of the threaded drive element are configured to move the threaded pushrod along the center axis of the threaded drive element, and wherein the threaded pushrod is configured not to rotate as the threaded drive element rotates, an outer surface of the threaded pushrod comprises a groove extending in an axial direction of the threaded pushrod, the groove is configured to engage with a fixed pin such that axial movement of the threaded pushrod leads to the fixed pin moving within the groove, rotation of the third threaded drive element about the third center axis of the third threaded drive element in the first direction is configured to transition the third switching pole from the open configuration to the closed configuration, and rotation of the third threaded drive element about the third center axis in the second direction counter to the first direction is configured to transition the third switching pole from the closed configuration to the open configuration.

* * * * *